E. F. BEEBE.
WRINGER.
APPLICATION FILED JUNE 1, 1920.
1,406,436. Patented Feb. 14, 1922.
2 SHEETS—SHEET 1.
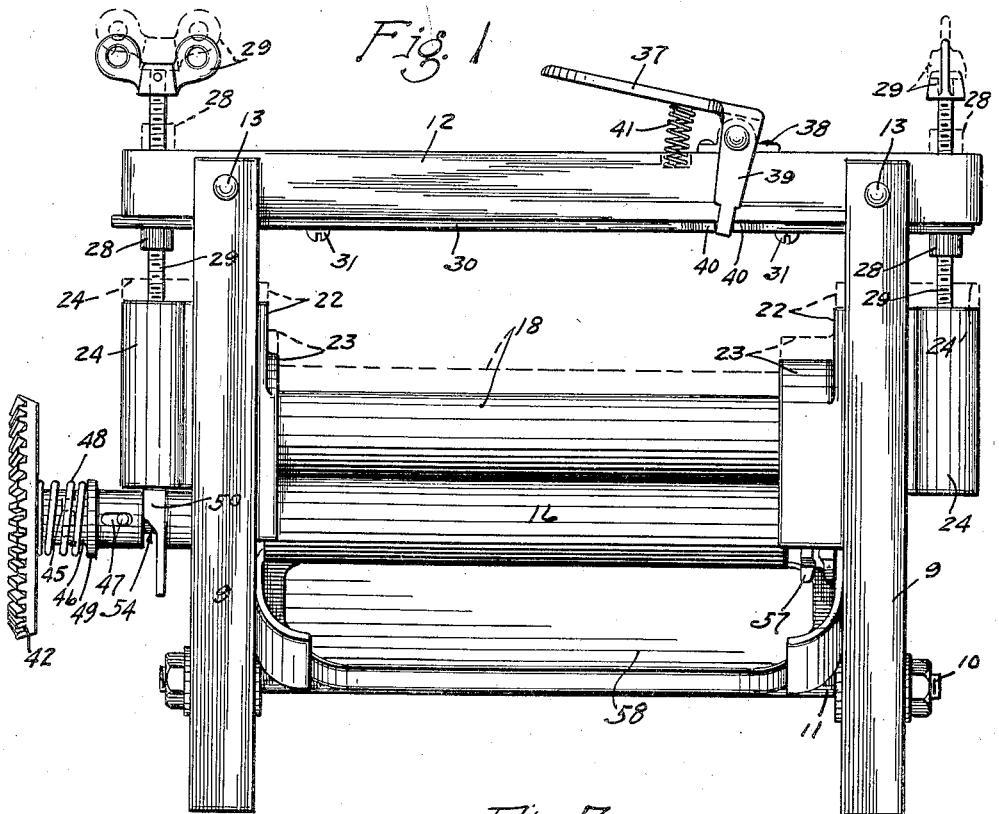
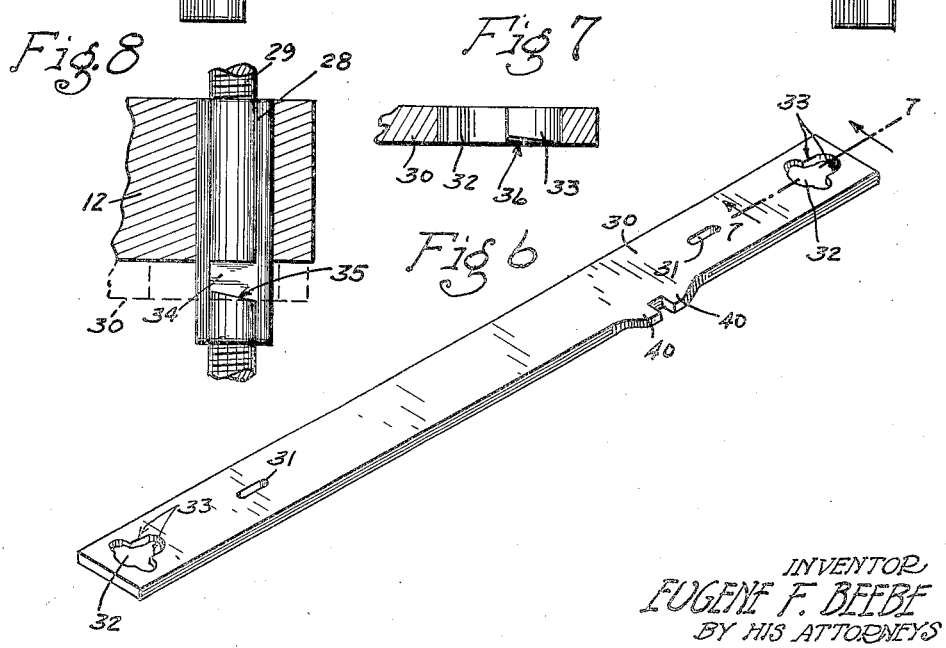
INVENTOR
EUGENE F. BEEBE
BY HIS ATTORNEYS E. F. BEEBE.
WRINGER.
APPLICATION FILED JUNE 1, 1920.
1,406,436.
Patented Feb. 14, 1922.
2 SHEETS—SHEET 2.
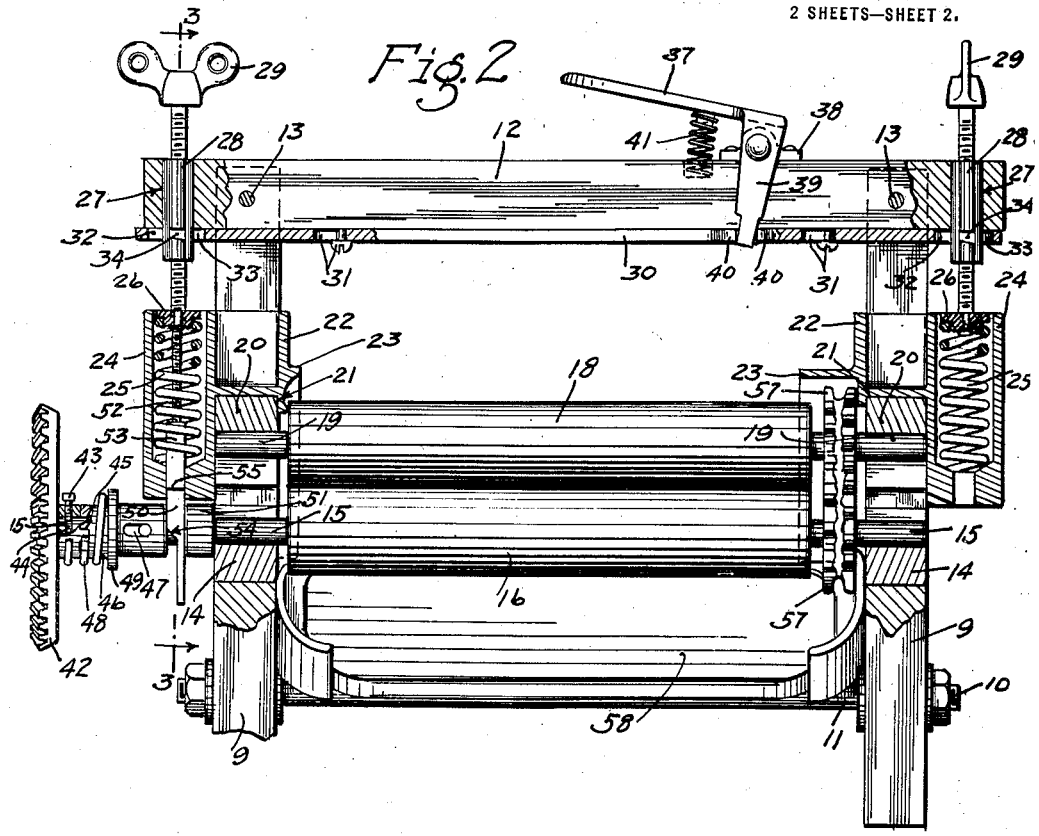
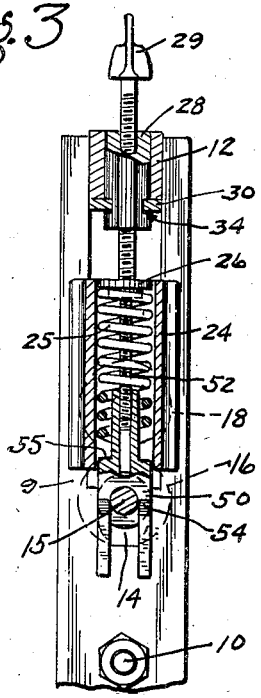
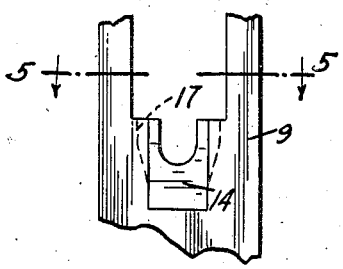
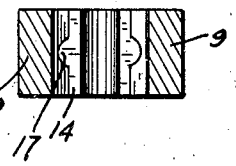
INVENTOR
EUGENE F. BEEBE
BY HIS ATTORNEYS
Williamson Merchant

UNITED STATES PATENT OFFICE.

EUGENE F. BEEBE, OF MINNEAPOLIS, MINNESOTA.

WRINGER.

1,406,436.      Specification of Letters Patent.      Patented Feb. 14, 1922.

Application filed June 1, 1920. Serial No. 385,658.

*To all whom it may concern:*

Be it known that I, EUGENE F. BEEBE, a citizen of the United States, residing at Minneapolis, in the county of Hennepin and State of Minnesota, have invented certain new and useful Improvements in Wringers; and I do hereby declare the following to be a full, clear, and exact description of the invention, such as will enable others skilled in the art to which it appertains to make and use the same.

My invention relates to improvements in clothes wringers and more particularly to such wringers that are operated by power and have means for releasing the tension on the co-operating rolls, and to this end, it consists of the novel devices and combinations of devices hereinafter described and defined in the claims.

In the accompanying drawings, which illustrate the invention, like characters indicate like parts throughout the several views.

Referring to the drawings:

Fig. 1 is an elevation of the improved wringer, with some parts shown in different positions by means of broken lines;

Fig. 2 is a view corresponding to Fig. 1, with the exception that some parts are sectioned and other parts are broken away;

Fig. 3 is a view partly in elevation and partly in transverse vertical section taken on the line 3—3 of Fig. 2;

Fig. 4 is a fragmentary detail view of one of the uprights of the wringer frame;

Fig. 5 is a transverse section taken on the line 5—5 of Fig. 4;

Fig. 6 is a perspective view of the releasing bar;

Fig. 7 is a detail view in longitudinal section taken on the line 7—7 of Fig. 6, on an enlarged scale; and Fig. 8 is a detail view partly in elevation and partly in longitudinal central section, with the end of the releasing bar, shown in Fig. 7, indicated by means of broken lines.

The frame of the improved wringer includes a pair of laterally spaced uprights 9 rigidly connected at their lower ends by a nut-equipped tie-rod 10 and a spacing thimble 11. The upper ends of the uprights 9 are bifurcated and rigidly connected by a tie-bar 12 inserted between the prongs of said upright and detachably secured thereto by nut-equipped bolts 13. At the crotches of the uprights 9, the spaces between the prongs thereof are contracted to receive bearing blocks 14 having open seats in which are journaled the trunnions 15 of a relatively stationary roll 16. The bearing blocks 14 are removably secured to the uprights 9 by forming thereon guide lugs 17, which have vertical sliding engagement with vertical guide channels in said prongs.

Co-operating with the relatively stationary roll 16 is an overlying relatively movable roll 18 having trunnions 19 journaled in bearing blocks 20, which also have open seats. These bearing blocks 20 are inverted in respect to the bearing blocks 14 and have their upper ends removably seated in pockets 21 formed in the under faces of a pair of bearings 22 slidably mounted on and between the prongs of the uprights 9. Formed with the inner sides of the bearings 22 are yoke-like guards 23, within which the ends of the rolls 15 and 18 project to prevent clothes, when passing between said rolls, from getting between the ends of said rollers and the uprights 9.

On the outer faces of the bearings 22 are spring pockets 24, which encase coiled pressure springs 25. Spring caps 26 are seated on the upper ends of the springs 25 and are arranged to close the upper ends of the spring pockets 24. It will be noted that the ends of the tie-bar 12 are extended outward at the uprights 9 and have formed therethrough seats 27 vertically aligned with the spring pockets 24. Sleeve-like nuts 28 are mounted in the seats 27 with freedom for endwise sliding movement, but are held thereby from turning.

Thumb-piece-equipped tension screws 29 have screw-threaded engagement with the sleeve-like nuts 28, and their lower ends are swiveled in the spring caps 26. A releasing bar 30 is mounted on the under side of the tie-bar 12 and is secured thereto with freedom for limited endwise movement by a pair of screws and co-operating slots 31. In the end portions of the releasing bar 30 are apertures 32, through which the lower ends of the sleeve-like nuts 28 project. These apertures 32 are longitudinally contracted in the same direction to afford co-operating pairs of lock shoulders 33 arranged to enter pairs of lock notches 34 formed in opposite sides of the sleeve-like nuts 28 and thereby afford bases of resistance for said nuts.

As best shown in Fig. 8, the lower faces of the lock notches 34 are beveled to afford cam surfaces 35, and as best shown in Fig. 7, the lower faces of the lock shoulders 33 are beveled in reverse direction from the cam surfaces 35 to afford cam surfaces 36 arranged for co-operation with said cam surfaces 35 to facilitate the movement of the lock shoulders 33 into and out of the lock notches 34.

Endwise movement may be imparted to the releasing bar 30 by a lever 37 overlying the tie-bar 12 and having depending ears fulcrumed to a bracket 38 rigidly secured to said tie-bar. Formed with one of the ears of the lever 37 is a depending finger 39, which extends between a pair of spaced lugs 40 on one of the edges of the releasing bar 30. A coiled spring 41, compressed between the tie-bar 12 and lever 37, yieldingly holds said lever in a raised position with the releasing bar 30 in a position to hold the sleeve-like nuts 28.

Loosely journaled on the left-hand trunnion of the relatively stationary roll 16 is a bevel gear 42 held against axial movement by a screw 43 in its hub, and which screw extends into an annular channel 44 cut in said trunnion. Formed with the hub of the gear 42 is a half-clutch 45, with which co-operates a half-clutch 46 on the left-hand trunnion 15 to lock the bevel gear 42 to said trunnion. The half-clutch 46 is secured to the left-hand trunnion 15 for rotation therewith, and with freedom for rotary sliding movement thereon by a slot and pin 47. A coiled spring 48, encircling the half-clutches 45 and 46, is compressed between the gear 42 and a collar 49 on the half-clutch 46 and is under strain to release said half-clutch 46.

A clutch-retainer 50 is provided for holding the half-clutch 46 interlocked with the half-clutch 45 against the tension of the spring 48. This clutch-retainer 50, as shown, is in the form of a fork, which straddles the left-hand trunnion 15 between the half-clutch 46 and a collar 51 on said trunnion. A depending stem 52, formed with the lower end of the left-hand tension screw 29, extends axially into the underlying pressure spring 25 and has internal screw-threaded engagement with a sleeve 53, which extends axially into said spring from the lower end thereof. Formed with the outer face of the clutch-retainer 50 is a cam surface 54 arranged to engage the half-clutch 46 when said clutch retainer is depressed to move said half-clutch axially into interlocking engagement with the half-clutch 45. When the clutch is released, the lower ends of the clutch-retainer 50 are positioned between the half-clutch 46 and collar 51 to facilitate the entrance of the cam surface 54 between said half-clutch and collar in setting the clutch.

The clutch-retainer 50 and its sleeve 53 are arranged to work in an aperture in the bottom of the left-hand spring pocket 24. A pair of shoulders 55 is formed on the upper end of the clutch-retainer 50 and arranged to engage the respective pressure spring 25 under certain conditions, as will presently appear. Any suitable means may be provided for driving the bevel gear 42, and the roll 18 is driven from the roll 16 by intermeshing gears 57. These gears 57 are confined entirely within the right-hand guard 23, which is considerably wider than the guard on the other end of the roll. The customary deflecting board 58 is located under the rolls 16 and 18 and pivoted to the uprights 9.

If an operator wishes to quickly release the pressure on the roll 18 to allow the same to separate from the rolls 16, in case he should get his fingers between the rolls, or for any other reason, it is only necessary for him to depress the lever 37, and which lever, as will be noted, is conveniently located on top of the tie-bar 12. This movement of the lever 37 will impart an endwise movement to the releasing bar 30, which will withdraw its lock shoulders 33 from the lock notches 34 and release the nuts 28, thereby destroying the bases of resistance for the pressure springs 25. When the pressure on the springs 25 is released, said springs, re-acting against the bottoms of the springs pockets 24, will lift the spring caps 26, nuts 28 and tension screws 29. At this same time, the driving action to the relatively stationary roll 16 will be automatically stopped by the lifting of the clutch-retainer 50 a distance sufficient to carry its cam surface 54 from between the half-clutch 46 and collar 51 and allow the spring 48 to release the clutch. This movement of the clutch-retainer is caused by the lifting movement of the left-hand tension screw 29, which is connected thereto by the stem 52 and sleeve 53. It may be here stated that the screw-threaded engagement of the stem 52 with the sleeve 54 permits independent adjustment of the left-hand tension screw 29 in applying the required pressure on the respective end of the movable roll 18. When the pressure on the roll 18 is removed, as above described, the released parts all remain in assembled relation or units and are held by the frame. It will be noted that the spring caps 26, in striking the releasing bar 30, will limit the upward movement of the released parts, and the shoulders 55, on the clutch-retainer 50, will, together with the overlying spring caps 26, hold the pressure springs 25 in position. Furthermore, the tie-bar 12 will prevent the pressure springs 25 from completely leaving the spring pockets 24. By thus confining the movements of the movable parts of the wringer when released, all danger of an operator being hurt by flying parts is eliminated.

To again apply pressure to the roll 18 and set the clutch, the tension screws 29 are first turned in a direction to unscrew the same part-way from the nuts 28 to lift the spring caps 26 and thereby afford clearance between said nuts and the release springs 25, so that the nuts 28 may be depressed and secured by the lock-bar 30. This turning movement of the left-hand screw 29, will unscrew the stem 52 part-way from the sleeve 53 of the clutch-retainer, which is held against rotation in the aperture in the respective spring pocket 24. A downward movement of the left-hand tension screw 29 will cause the cam 54, of the clutch-retainer 50, to engage the half-clutch 46 and move the same axially into interlocking engagement with the half-clutch 45. The nuts 28 are then positioned and secured by the retaining bar 30. Then by turning both of the tension screws 29 in the proper direction, the movable roll 18 may be forced onto the relatively stationary roll 16 under the desired pressure.

What I claim is:

1. The combination with a frame, of co-operating pressure rolls, a yieldingly held driving element releasably connected to one of the rolls, a pressure spring operative on one of the rolls, a tension screw operative on the pressure spring and having a sleeve-like nut guided by the frame, means for holding said nut fixed and for releasing the same, and means connected with and arranged to be actuated by the tension screw when said nut is released to release the driving element.

2. The combination with a frame, of co-operating pressure rolls, a spring pocket, a pressure spring mounted in the spring pocket and operative on one of the rolls, a tension screw having a spring cap for the pressure spring and also having a sleeve-like nut guided by the frame, and means for holding said nut fixed and for releasing the same, said spring cap being arranged, when said nut is released, to prevent the pressure spring from leaving the spring pocket and the pressure screw and the nut from leaving the frame.

3. A wringer comprising a frame having fixed and movable bearings and co-operating stationary and movable rolls journaled, respectively, therein, a driving wheel, a clutch for connecting the driving wheel to said stationary roll, means under strain to release the clutch, pressure springs operative on the movable bearings, tension screws operative on the pressure springs and having sleeve-like nuts guided by the frame, means for holding said nuts fixed and for releasing the same, and means normally holding the clutch set and arranged to be actuated to release the clutch by one of the tension screws when said nuts are released.

4. The combination with a frame comprising uprights and a bar connecting the same and extending outward of the ends thereof, of co-operating pressure rolls, spring pockets carried by one of the rolls outward of the frame uprights, pressure springs in the spring pockets, tension screws operative on the pressure springs and having sleeve-like nuts guided by the extended ends of the frame bar, and means for holding said nuts fixed and for releasing the same.

5. A wringer comprising a frame having fixed and movable bearings and co-operating stationary and movable rolls journaled respectively therein, a driving wheel, a clutch for connecting the driving wheel to said stationary roll, means under strain to release the clutch, pressure springs operative on the movable bearings, tension screws having spring caps operative on the pressure springs and also having sleeve-like nuts guided by the frame, means for holding said nuts fixed and for releasing the same, a clutch-retainer normally holding the clutch set and connected to one of the tension screws for common endwise movement therewith but permitting turning movement of said screw in respect thereto, said spring caps being arranged to prevent the tension screws and their sleeve-like nuts from leaving the frame and the pressure springs from leaving the movable bearings when said nuts are released.

6. A wringer comprising a frame having fixed and movable bearings and co-operating stationary and movable rolls journaled, respectively, therein, a driving wheel, a clutch for connecting the driving wheel to said stationary roll, means under strain to release the clutch, pressure springs operative on the movable bearings, tension screws operative on the pressure springs and having sleeve-like nuts guided by the frame, means for holding said nuts fixed and for releasing the same, a clutch-retainer normally holding the clutch set, and a stem on one of the tension screws having screw-threaded engagement with the clutch-retainer.

7. A wringer comprising a frame having fixed and movable bearings and co-operating stationary and movable rolls journaled, respectively, therein, tension screws having sleeve-like nuts guided by the frame, spring caps carried by the tension screws, pressure springs interposed between the movable bearings and spring caps, said spring caps being arranged to limit the releasing movement of the tension screws, a releasing bar mounted on the frame for holding said nuts fixed and for releasing the same, and means for operating the releasing bar.

8. A wringer comprising a frame having fixed and movable bearings and co-operating stationary and movable rolls journaled, respectively, therein, said movable bearings having spring pockets, tension screws having sleeve-like nuts guided by the frame, pressure springs seated in said pockets, spring caps for the pressure springs arranged to be engaged by the tension screws, said spring caps being arranged to limit the releasing movement of the tension screws and pressure springs, a releasing bar for holding said nuts fixed and for releasing the same, and means for operating the releasing bar.

9. The combination with a frame, of co-operating pressure rolls, a pressure spring operative on one of the rolls, a tension screw operative on the pressure spring and having a sleeve-like nut guided by the frame, said nut having on its sides diametrically opposite lock elements, and a releasing bar mounted on the frame and having lock shoulders movable into and out of engagement with the lock elements to hold said nut fixed and for releasing the same.

10. The combination with a frame comprising uprights and a bar connecting the same and extending outward thereof, of co-operating pressure rolls, movable bearings carried by one of the rolls and movable within the uprights, said bearings having spring pockets outward of the uprights and guards for the ends of the rolls inward of the uprights, pressure springs in the spring pockets, tension screws operative on the pressure springs and having sleeve-like nuts guided by the extended ends of the frame bar, and means for holding said nuts fixed and for releasing the same.

11. A wringer having a frame including a fixed tie-bar, a stationary roll journaled on the frame, a pair of movable bearings slidably mounted on the frame, a movable roll journaled in the movable bearings for co-operation with said stationary roll, pressure springs operative on the movable bearings, tension screws operative on the pressure springs and having sleeve-like nuts mounted in the tie-bar for endwise sliding movement, said nuts having in their opposite sides lock notches, an endwise movable releasing bar mounted on the tie-bar and having lock shoulders arranged to enter the lock notches in said nuts fixed for holding the same, and means for operating the releasing bar, said lock notches and shoulders being provided with co-operating cam surfaces.

12. The combination with a frame, of co-operating pressure rolls, cylindrical spring pockets carried by one of the rolls and having open tops, said spring pockets being actually aligned with the rolls and located outward of the ends thereof, spring caps for the pressure springs closing the open tops of the spring pockets, tension screws operative on the pressure springs and having sleeve-like nuts guided by the frame, and means for holding said nuts fixed and for releasing the same.

13. The combination with a frame comprising uprights and a bar connecting the same, of co-operating pressure rolls, pressure springs operative on one of the rolls, tension screws operative on the pressure springs and having sleeve-like nuts mounted in seats in the frame, said nuts being provided with diametrically opposite longitudinally extended ribs each of which has a lock notch, said ribs adapted to hold said nuts from turning in their seats, and a single endwise movable releasing bar mounted on the frame and adapted to be moved into and out of the lock notches on diametrically opposite sides of the nuts to hold said nuts fixed and for releasing the same.

14. The combination with a frame comprising uprights having aligned slots and a bar connecting the uprights above their slots and extending outward thereof, of co-operative pressure rolls, bearings carried by one of the rolls and movable in the slots in said uprights, spring pockets on the bearings outward of the uprights, pressure springs in the spring pockets, pressure screws operative on the pressure springs and having sleeve-like nuts guided by extended ends of the frame, and a single endwise movable releasing bar mounted on the under side of the frame bar, extending through the slots in the uprights and adapted to be moved into and out of interlocking engagement with said nuts for holding the same fixed and for releasing the same.

In testimony whereof I affix my signature.

EUGENE F. BEEBE.